Aug. 2, 1938. V. H. TURKINGTON 2,125,827
COATING ARTICLES
Filed Dec. 24, 1936
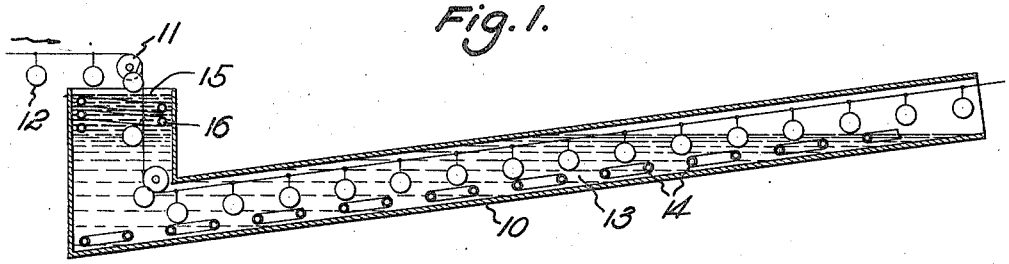
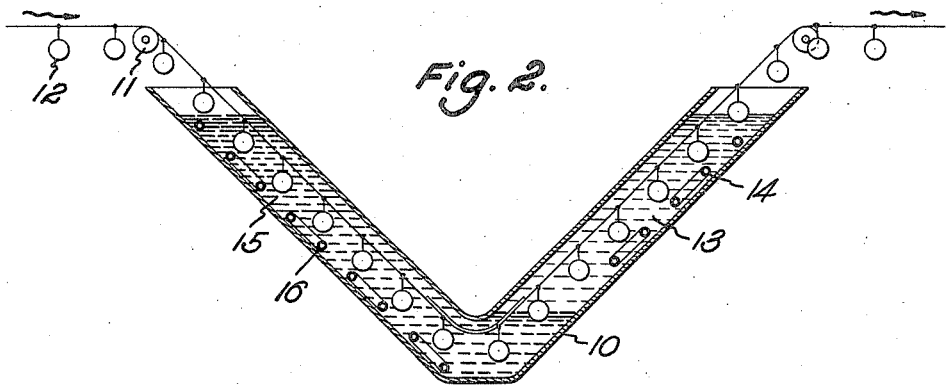
Inventor:
Victor H. Turkington
By Potter, Pierce & Scheffler
Attorneys.

UNITED STATES PATENT OFFICE 2,125,827

COATING ARTICLES

Victor H. Turkington, Caldwell, N. J., assignor to Bakelite Corporation, New York, N. Y., a corporation of Delaware Application December 24, 1936, Serial No. 117,629

5 Claims. (Cl. 91—70)

This invention relates to the coating of articles and is particularly directed to a method of applying to articles indurated coatings of heat-hardenable compositions, especially synthetic resinous compositions, such as phenol-aldehyde condensation products, polybasic acid-polyhydric alcohol condensation products and the like.

The invention comprises a method of coating articles by applying to the articles a heat-hardenable composition in liquid form and thereafter immersing the article without intermediate exposure in a heated liquid material immiscible with and neutral to the heat-hardenable composition which is in direct contact therewith. The heating liquid may be, for example, a molten metallic alloy of low melting point, an oil, a molten wax or other inert relatively non-volatile organic liquid or melted solid.

Methods of coating heretofore used, such as brushing, dipping, flow coating and spraying have in general involved the use of volatile solvents in the coating composition, which entailed a drying operation to remove the volatile solvents. In the case of compositions including drying oils, a more or less prolonged exposure to air or oxygen to bring about the oxidation and hardening of the coating is required.

The method of the present invention makes possible the elimination of volatile solvents, as the coating materials preferably used are liquid or fusible at the temperature of application. The thickness of coating film applied may be regulated by suitable adjustment of the temperature and of the viscosity of the coating composition. The elimination of the use of volatile solvents constitutes a great economic saving, as most coating materials now in use contain large proportions of solvents, especially those materials which are applied by the spraying process, where the material may contain as much as 90% solvent and only 10% solid matter. These solvents are seldom recovered and are a complete loss. At the same time, they constitute a great fire and explosion risk and in some cases a menace to health of workmen. The necessity of removing them rapidly requires the installation of expensive ventilating systems requiring much floor space. Also, a film deposited by evaporation of a volatile solvent is likely to be porous or full of small "pin holes" due to the bubbles formed by the escaping solvent, such "pin holes" detracting from the effectiveness of the film as a protective coating, and several thin coats are therefore required to insure protection. Thicker coatings almost always result in more porous films. By the present invention, however, relatively thick coatings can be applied without producing bubbles or blisters in the film.

The method of the invention eliminates excessive drainage or flow which occurs in dipping and flow coating processes now in use and which causes flow marks on the surface and particularly causes a much thicker coating on the lower part of the article. Also the excessive flow makes it difficult to secure uniform colors by the dipping process, as pigments tend to separate from the vehicle and form vertical lines of different shades. In the method of the invention the flow of the coating material is prevented or retarded by the action of the liquid heating medium to such an extent that very smooth uniform coatings can be applied. This is partly due to the friction occurring between the coated article and the heating medium, which exerts a wiping action, tending to smooth out the film and fill up cracks, depressions or other irregularities in the surface being coated. Another important factor in preventing excessive flow is the relation of the specific gravities of the coating material and heating medium. For example, if the heating medium be a molten metal, having a specific gravity of say 6.0 and the coating material be a liquid phenolic condenstion product having a specific gravity of 1.25, there can be no downward drainage of the coating material. Whatever flow occurs will be in an upward direction. It will thus be seen that the forces regulating flow of the coating material are quite different, under the conditions provided by this invention, from the forces causing flow, in coating processes now in general use, where the coating is allowed to drain in the air, not immersed in a liquid medium. The coating materials preferred for use in this method are of such nature that they "set" or harden soon after being immersed in the heating medium and by the time the coated article is removed from the heating medium and again comes in contact with air, it has lost all tendency to flow.

The use of a liquid heating medium provides a very much more efficient transfer of heat than does a gaseous heating medium and the new method is therefore, not only faster, but more economical of heat than the baking ovens now used. This is particularly true when a molten metal is used as the heating medium.

Since all organic coating materials are subject to oxidation when heated to moderately high temperatures in contact with air, the exclusion of air by carrying out the heating operation immersed in an inert liquid is of great importance in preventing oxidation, color changes, and excessive hardening of the surface skin. Also, it is found that much higher temperatures may be used without danger of injuring the coating when air is excluded, thus allowing operation at maximum speed.

For the purpose of illustrating the principles of the invention it will be described with particular reference to the accompanying drawing in which:

Fig. 1 is a diagrammatic representation of an illustrative embodiment of the invention; and Fig. 2 is a diagrammatic representation of a modified form embodying the principles of the invention.

In Fig. 1, 10 is a container, through which a suitable conveying device 11 passes, upon which articles 12 to be coated may be carried. In operation, the container is provided with a body of heating liquid 13, for example, a low melting metallic alloy, which may be maintained at a predetermined temperature, preferably increasing in the direction of travel of the articles, by means of a heating medium in coils 14. At the end of the container which the articles to be coated enter is provided a body or layer of coating composition 15 which may be cooled or heated to maintain a predetermined temperature by means of coils 16. The layer 15 is preferably maintained at a substantially constant level, advantageously by automatic means of known design. The article to be coated first passes through the layer of liquid coating composition 15 wherein it receives a coating film of the composition the thickness of which is determined by the viscosity and temperature of the composition. The coated article then passes directly into the heating medium, without exposure to the air and without any opportunity to drain or flow, thus insuring a very uniform coating without "curtains", "sags" or "drip." When the heating medium, as in Fig. 1, has a higher specific gravity than the coating composition, whatever flow of coating composition occurs is in an upward direction and it is possible to so regulate the conditions that practically no flow occurs. As the article progresses through the heating medium at progressively increasing temperatures, the coating composition gradually sets to a hard, adherent film by the time it emerges from the heating medium at the discharge end of the container.

The form of apparatus shown in Fig. 2 is particularly adapted for use when the heating liquid is of lower specific gravity than the coating composition, for example, when using mineral oil, paraffin or the like which floats on the composition without mixing therewith. In this figure, in which like numerals denote similar elements to those in Fig. 1, the heating liquid 13 floats on top of the coating composition 15 in the exit leg of the container.

While the method has been described, by way of example in a continuous operation, which is, for obvious reasons, the most practical mode of operation where a large number of articles of similar size and shape are to be coated, the method may also be applied to intermittent operation wherein the article after coating with the heat-hardenable composition is passed into the heating liquid and allowed to remain stationary until the coating has hardened.

When the material used as a heating medium is of such a nature that some of it tends to cling to the hardened coating, the articles may be subjected to a washing operation after they are removed from the heating bath. For example, if paraffin is used as the heating medium, all traces of the paraffin may be removed from the surface of the coating by washing or dipping the article in gasoline. When low melting alloys are used, no washing is usually required.

The method of the invention may be used in applying coatings of compositions containing, or consisting of, any substance capable of hardening when subjected to heat. Of particular suitability are the heat-hardenable synthetic resinous compositions, typified by the condensation products of phenols and aldehydes, such as formaldehydes, and condensation products of polyhydric alcohols, such as glycerine, with polybasic acids, such as phthalic acid. The compositions may be modified as desired by the addition of plasticizers, toughening agents, fillers, dyes, pigments and the like.

Many of the compounds are liquid or readily fusible in the earlier stages of their formation and the method of the invention is particularly suited to the use of the compounds in this condition, but other heat-hardenable substances which are solid and not readily fusible may be used by bringing them into the liquid condition by any suitable means.

Among the advantageous applications of the process of the invention is the coating of articles in extended form, for example, wire and cable with heat-hardenable compositions. For the coating of wires and cables the containers 10 as shown in Figures 1 and 2 of the drawing may advantageously comprise pipes or tubes of small diameter.

I claim:

1. A method of coating articles which comprises passing the articles successively through a body of a heat-hardenable composition in liquid form and through a body of a heated liquid immiscible with the coating composition without intermediate exposure.

2. A method of coating articles which comprises passing the articles successively through a body of a heat-hardenable composition in liquid form and through a body of a heated liquid immiscible with the coating composition, said heated liquid being in immediate surface contact with the heat-hardenable composition.

3. A method of coating articles which comprises passing the articles successively through a body of a heat-hardenable composition in liquid form and through a body of a heated liquid immiscible with the coating composition, said heat-hardenable composition being superposed on the heated liquid.

4. A method of coating articles which comprises passing the articles successively through a body of a heat-hardenable composition in liquid form and through a body of a heated liquid immiscible with the coating composition, said heat-hardenable composition having two free surfaces upon one of which surfaces the heated liquid is superposed.

5. A method of coating articles which comprises passing the articles successively through a body of a heat-hardenable composition in liquid form and through a body of a heated liquid immiscible with the coating composition, said heated liquid being in immediate surface contact with the heat-hardenable composition and increasing in temperature in the direction away from the heat-hardenable composition.

VICTOR H. TURKINGTON.